United States Patent [19]

Walsh

[11] 4,206,714
[45] Jun. 10, 1980

[54] MANUALLY OPERABLE GRASS SEEDER

[76] Inventor: Robert F. Walsh, 167 W. Clinton Ave., Bergenfield, N.J. 07621

[21] Appl. No.: 938,324

[22] Filed: Aug. 30, 1978

[51] Int. Cl.$^2$ ............................................... A01C 5/02
[52] U.S. Cl. ....................................... 111/92; 111/95; 222/189; 222/450
[58] Field of Search .................. 111/1, 10, 89, 93, 94, 111/95, 96, 97, 98, 92; 222/189, 449, 450, 451, 453, 510, 518

[56] References Cited

U.S. PATENT DOCUMENTS

| | | | |
|---|---|---|---|
| 1,802,059 | 4/1931 | Maciejski | 111/1 X |
| 2,045,774 | 6/1936 | Hirschy | 222/518 X |
| 2,600,131 | 6/1952 | Schwarm et al. | 111/92 X |
| 2,737,318 | 3/1956 | Molinare | 222/451 X |
| 3,016,171 | 1/1962 | Becher | 222/518 X |
| 3,232,498 | 2/1966 | Bennett | 222/453 X |

*Primary Examiner*—Edgar S. Burr
*Assistant Examiner*—James R. Feyrer
*Attorney, Agent, or Firm*—Anthony J. Casella; Michael A. Stallman

[57] ABSTRACT

A device for preparing and reseeding small bare spots in a lawn is in the form of a telescoping tubular member having upper and lower, relatively slidable tubes, with the storage hopper for the grass seeds being provided in the upper tube, and wherein a valve means is provided at the connection between the upper and lower tubes for controlling the flow of seeds from the storage hopper through the lower tube to the bare spot on the ground. The valve means preferably comprises a caged ball secured within the upper tube, and an actuating means secured to the lower tube. Spring biasing means are provided to maintain the tubular member in its extended position, with the valve means being closed. The lower end of the lower tube is formed with teeth for initially scoring the bare spot. Next, the tubular member is compressed along its axial length, thereby momentarily actuating the ball valve to enable a measured amount of grass seed to fall through the tubular member for deposit on the ground. In its fully compressed position, the ball closes off the hopper so as to prevent additional seed from falling through the seeder, and when the tubular member is released, the spring means telescopes the tubes so as to again close off the ball valve. A screen may be provided in the lower tube for aiding in the uniform distribution of the seeds.

13 Claims, 4 Drawing Figures

MANUALLY OPERABLE GRASS SEEDER

The subject invention relates to a portable, hand-operated grass seeder or distributor, and has for its object to provide a device which may be quickly and conveniently manipulated, which will at each operation discharge a measured quantity of seed and distribute spread the same at a predetermined manner, and which is of simple and durable construction, efficient in use, and which is capable of being economically manufactured.

In the maintenance of a lawn, due to the effects of fungus, insects, and animals, bare spots or patches of dead grass must be constantly replaced, and it is for this purpose that the subject reseeding device has been developed. During the growing season of grass, it is usually required that the average homeowner repair at least a few bare spots at different locations within the lawn, and generally this requires first preparing the soil by scraping the soil to a depth of about one-quarter inch, and then depositing new seed onto the scraped soil area. Usually, this involves the use of a common scraping tool, usually having a short handle, such that the homeowner must bend down for scraping, and then hand distribute the seeds over the scraped area. As can be appreciated, in the case of elderly people or people having bad back or knee problems, this task is burdensome.

Accordingly, it is an object of this invention to provide a device for scraping a bare spot in a lawn, and for depositing a measured amount of seed on the bare spot for regrowth of the grass.

It is a further object to provide a device which does not require the user to bend down into uncomfortable positions to prepare the soil and to spread the seed.

It is still a further object to provide a device that insures a uniform distribution of a measured amount of seed over the area to be covered.

It is another object of the invention to provide a device which is simple and inexpensive to manufacture, and is durable.

It is a further object of the invention to provide a device which stores seed in a substantially moisture-free hopper.

The above and additional and further objects and advantages of the invention are achieved by a manually operated grass seeder in the form of an elongated, telescoping tubular member having relatively movable upper and lower tubes. The tubes are biased in their extended elongated position by a spring means disposed at the connection between the upper and lower tubes, and the upper tube includes a storage hopper for the seeds. The upper end of the storage hopper is defined by a handle threadably connected to the upper tube for enabling refilling of the hopper. The lower end of the hopper is closed by a ball check valve, with the ball being confined within a cage, and spring biased to a downward position for closing off the hopper. Attached to the upper end of the lower tube is an actuating means in the form of a pyramidal-shaped member having openings therein to allow the seed to pass therethrough. The lower end of the lower tube includes teeth for initial scraping of the bare spot preparatory to the deposit of seeds thereon.

In operation, after the bare spot has been prepared by scraping with the lower end of the tubular member, the upper tube is moved downwardly relative to the lower tube such that the actuating member forces the spring-biased ball to its uppermost position against the upper portion of the cage, thereby closing off the hopper. Seed which was present within the cage portion and surrounding the ball is thus allowed to fall through the lower end of the cage, through the actuating means, and then through the length of the lower tube for deposit onto the bare spot. If desired, a screen may be provided intermediate the length of the lower tube and disposed perpendicular to the length of the tube, and operative to aid in uniformly distributing the seed across the entire cross-sectional area of the device. The amount of seed which is released by the device is a measured amount of seed generally corresponding to the amount of seed initially within the area of the check valve cage.

Further objects and advantages of the invention will become apparent from a reading of the following detailed description taken in conjunction with the drawings in which.

Figures 1, 2:
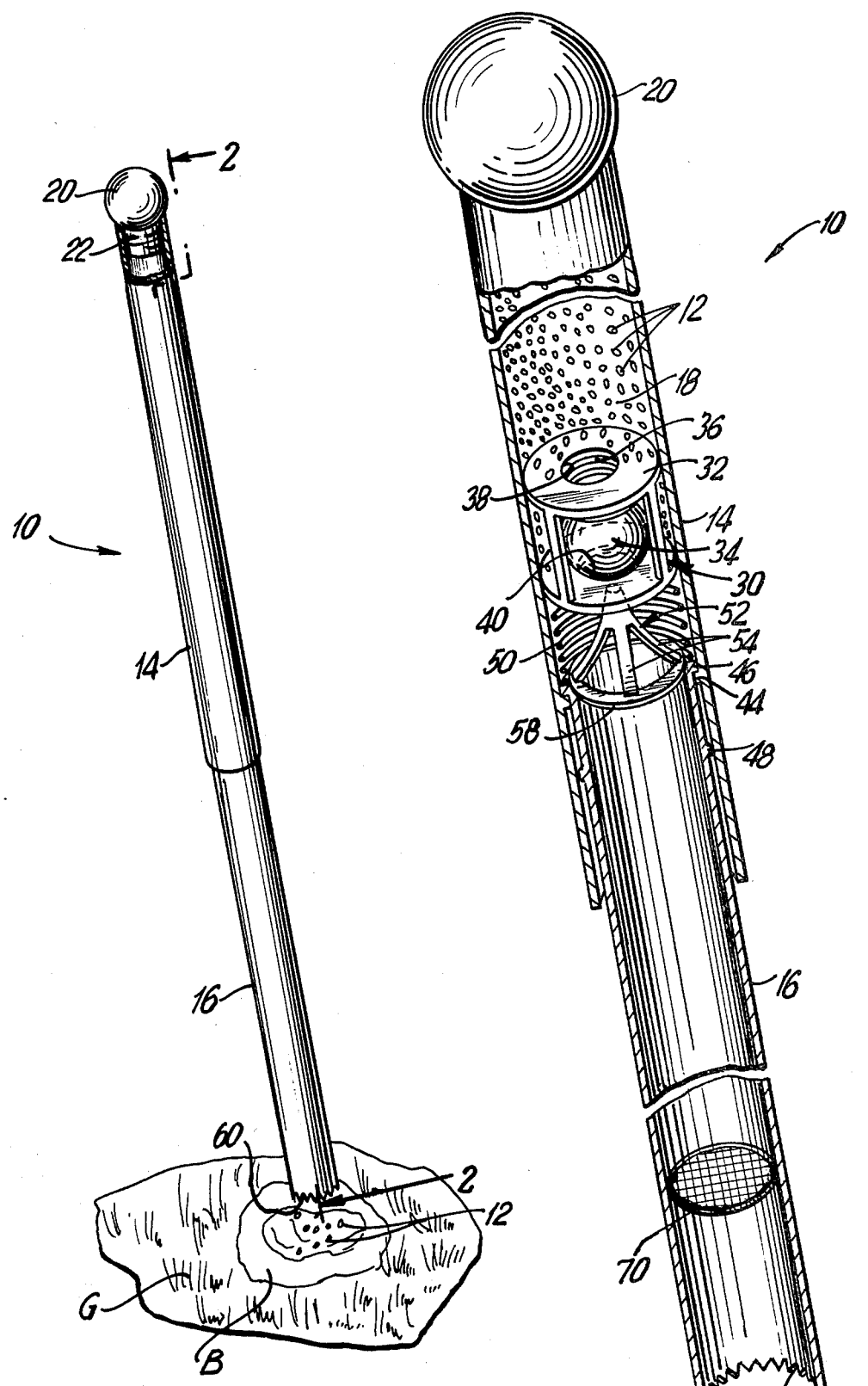
FIG. 1 is a perspective view of the grass seeder of the subject invention.
FIG. 2 is a perspective view of the grass seeder of the subject invention.

Turning to FIG. 1, the manually operable grass seeder of the subject invention is generally designated by the numeral 10 and is intended for use in preparing and reseeding a bare spot B in a lawn, designated by the letter G. Generally, the bare spot B is on the order of five to eight inches in diameter and is a patch of ground where the grass has been destroyed as a result of fungus, insects, or animals. The lowermost portion of the grass seeder 10 includes scarifying teeth 60 for initially scraping or roughing up the bare soil to a depth of ¼ inch to ½ inch for aiding in the growth of the newly implanted grass seeds. After the soil has been prepared, the grass seeder 10 is manually operated to allow a measured amount of grass seed 12 to be deposited onto the bare spot B. Since the length of the grass seeder 10 is on the order of about forty inches, it is not necessary for the user to bend over in order to scrape or to deposit the grass seed on the bare spot B, thereby greatly facilitating the reseeding of bare spot in a quick and efficient manner.

Referring to FIG. 2, the grass seeder 10 basically comprises an elongated, telescoping tubular member including an upper tube 14 and a lower tube 16. The tubes are relatively slidable, with the upper tube 14 having at its upper end a hopper 18 for storage of the grass seed 12. A ball handle 20 is threadably connected to the upper tube as at 22 and provides access to the hopper 18 for refilling with grass seed 12. The lowermost end of the hopper 18 is closed off by a ball check valve assembly 30 including a cage 32 and a vertically movable ball 34. The cage 32 is fixed within the upper tube and includes an upper opening 38 and a lower opening 40, with the ball 34 being biased against the lower opening 40 by a first spring 36 extending between the ball and the upper portion of the cage 32. In the extended position of the tubular member, the ball 34 closes off the opening 40 (see FIG. 3) thereby preventing seed disposed within the hopper and within the cage from passing through the opening 40. The upper tube 14 includes an internal flange 44 which cooperates with upper flange 46 and intermediate flange 48 of the lower tube 16 in limiting the extent of relative sliding movement between the upper tube 14 and the lower tube 16. Extending between the flange 46 and the lower end of the ball check valve assembly 30 is a second spring 50 which biases the upper and lower tubes of the tubular member to the extended position, at which time the annular flange 44 of the upper tube abuts the upper flange 46 of the lower tube 16. Fixedly connected to the upper flange 46 of the lower tube 16 is a pyramidal-shaped actuating element 52 including spaced legs 54 and a base portion 56, the latter being mounted on the flange 46. The spaces between the legs 54 of the pyramidal-shaped actuating member 52 insures the ready passage therethrough of the seed upon actuation of the grass seeder 10. The apex 56 of the actuating member 52 is aligned with the lower opening 40 in the cage 32, such that upon telescoping of the lower tube relative to the upper tube, the apex 56 engages the ball and forces the latter to its upward position so as to close off the opening 38 (see FIG. 4). At such time, the seeds 12 which are disposed in the cage 32 are allowed to pass through the lower opening 40 and thus between the spaced legs 54 and then through the lower tube 16 for disposition on the bare spot B of the ground G. In order to insure the uniform dispersion of the seed onto the bare spot, a screen 70 may be releasably or permanently secured intermediate the length of the lower tube 16, in a plane generally perpendicular to the longitudinal axis of the tubular member. As the seeds fall under the force of gravity and impinge on and pass through screen 70, any seed clumps will be broken up by the mesh of the screen.

Figure 3:
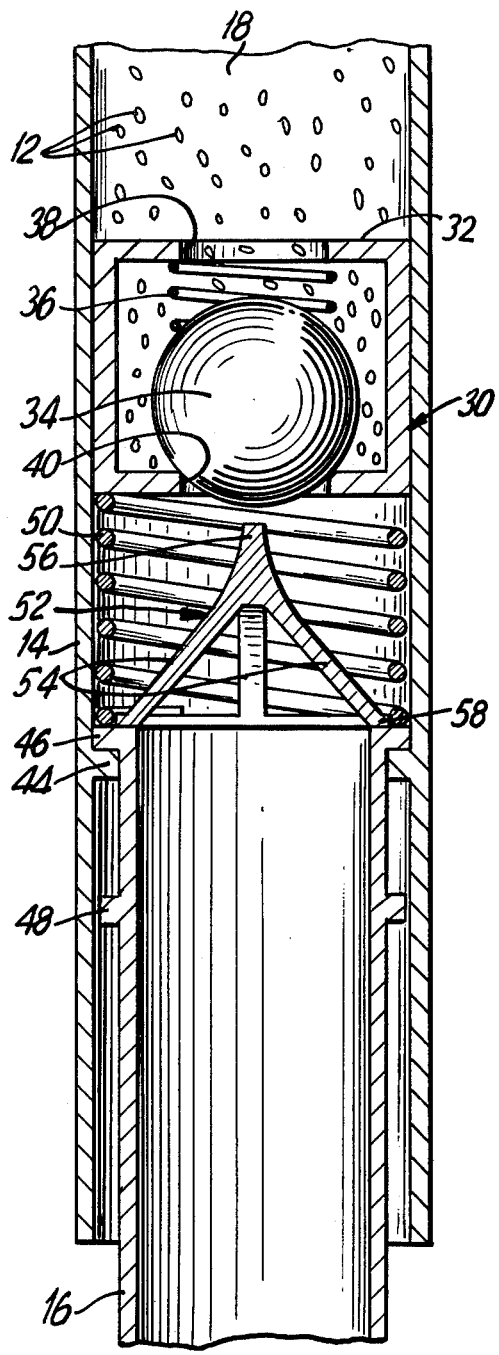
FIG. 3 is a partial cross-sectional view of the valve control means of the grass seeder of the subject invention.

In operation, with the tubular member in its extended position, such that the ball check valve assembly 30 is closed, and with the ball 34 closing off the opening 40, the user scrapes the bare spot 40 by means of the teeth 60 at the lower end of the grass seeder 10. During this time, the ball check valve assembly is in the position as illustrated in FIG. 3.

Figure 4:
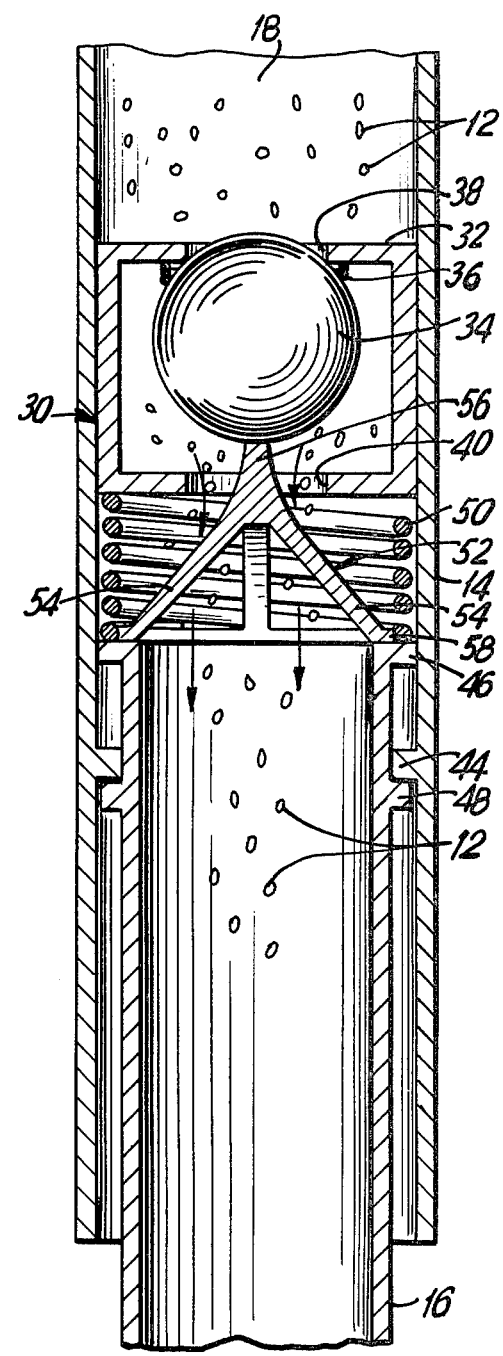
FIG. 4 is a view similar to FIG. 3 but illustrating the ball check valve in its actuated position such that seeds are released for deposit on a bare spot on the ground.

Next, in order to dispense seeds 12 onto the bare spot B, it is merely necessary for the user to press vertically downwardly on the ball handle 20 so as to overcome the biasing force of the second spring 50 in order to slide the upper tube 14 relative to the lower tube 16. At such time, as illustrated in FIG. 4, the biasing force of first and second springs 36,50—, therefor are overcome, such that the apex 56 of the pyramidal-shaped actuating member engages the ball 34 and forces it upwardly away from the opening 40 and into engagement with the opening 38. Hence, the seeds within the hopper 18 are prevented from escaping through opening 38. At such time, seeds 12 which are disposed within the cage 32 are allowed to pass through the opening 40, and then between the spaces of the legs 54, and thence through the length of the lower tube 16 for distribution on the bare spot B. As the seeds fall through the length of the tube, screen 70 aids in uniformly distributing the seed across the entire cross-sectional area of the tubular member. As is readily appreciated, only a measured amount of seed is allowed to pass through the lower tube for deposit on the bare spot. Upon release of the downward pressure by the user, springs 50 and 36 function to extend the length of the tubular member and force the ball 34 back to its initial position against the lower opening 40 in the cage 32. At such time another limited quantity of grass seed 12 is allowed to fall into the cage 32 preparatory to the next reseeding cycle of operation of the grass seeder.

It is noted that flanges 46 and 48 of the lower tube 16 cooperate with the flange 44 of the upper tube 14 in limiting the extent of relative movement between the upper and lower tubes.

Preferably, the grass seeder 10 is formed of a moldable plastic material such that the hopper 18 is relatively moisture-free, thereby minimizing the extent of clumping of the grass seeds during extended periods of storage. The screen 70 may be either fixedly secured to the inner tube 16, or may be releasably connected thereto.

From the foregoing, it will be seen that a device is provided which may be easily and expeditiously operated to deposit at each operation a perfectly regulated amount of grass seed, to spread the same evenly in a desired manner, and includes means for preparing the soil such that the seeds may be readily placed for facilitating growth. It will also be seen that the seeds are completely enclosed at all times until a predetermined quantity has been deposited.

It is to be understood that changes and various details of construction and arrangement of parts may be made without departing from the spirit of the invention except as defined in the appended claims.

What is claimed is:

1. A manually operable grass seeder for preparing and reseeding bare spots comprising:
 an elongated, telescoping tubular member including relatively slidable upper and lower tubes, said upper tube including a storage hopper for seeds therein adjacent the upper end thereof, a ball check valve assembly fixedly mounted within the upper tube adjacent the lower end thereof, said ball check valve assembly defining the lower end of said storage hopper, said ball check valve including a ball mounted in a cage, said cage having an upper and lower opening, said upper opening being in communication with said storage hopper, said ball check valve further including a first spring means for biasing said ball downwardly to cover and seal said lower opening;
 said lower tube being telescopingly received within said upper tube and including means at the upper end thereof for actuating said ball check valve to an open position; and
 second spring means disposed between said upper and lower tubes and operable to bias said telescoping tubes in the extended position wherein said ball covers and seals said lower opening in said cage with said upper opening being left uncovered thereby allowing a fixed amount of seed to fill said cage, whereby upon manual telescoping of said upper and lower tubes relative to each other said means for actuating said ball check valve displaces said ball upwardly such that said lower opening is uncovered and said upper opening is simultaneously covered and sealed thereby allowing the fixed amount of seed in said cage to pass through the lower tube for deposit on the bare spot.

2. A manually operable grass seeder for preparing and reseeding bare spots as in claim 1 wherein said lower tube has a toothed lower end portion for scoring the bare spot to be reseeded.

3. A manually operable grass seeder for preparing and reseeding bare spots as in claim 1 wherein the upper end of the upper tube is closed by a removable handle that defines the upper portion of said storage hopper for the seeds.

4. A manually operable grass seeder for preparing and reseeding bare spots as in claim 3 wherein said handle is a ball type handle threadedly connected to the upper end of the upper tube.

5. A manually operable grass seeder for preparing and reseeding bare spots as in claim 1 further including a screen disposed intermediate the length of the lower tube for aiding in uniformly distributing of the seed onto the bare spot.

6. A manually operable grass seeder for preparing and reseeding bare spots as in claim 1 wherein said upper and lower tubes include annualar flanges extending perpendicular to the length of the tubular member for limiting the extent of telescoping of said tubes.

7. A manually operable grass seeder for preparing and reseeding bare spots as in claim 1 wherein said actuating means comprises a pyramidal-shaped member having open sides to allow seed to pass therethrough.

8. A manually operable grass seeder for preparing and reseeding bare spots as in claim 1 wherein said telescoping tubular member is formed of a plastic material.

9. A manually operable grass seeder for preparing and reseeding bare spots comprising:
   an elongated, telescoping tubular member made of a plastic material and including relatively slidable upper and lower tubes, said upper tube including a storage hopper for seeds therein adjacent the upper end thereof, a ball check valve assembly fixedly mounted within the upper tube adjacent the lower end thereof, said ball check valve assembly defining the lower end of said storage hopper, said ball check valve including a ball mounted in a cage, said cage having an upper and lower opening, said upper opening being in communication with said storage hopper, said ball check valve further including a first spring means for biasing said ball downwardly to cover and seal said lower opening;
   said lower tube being telescopingly received within said upper tube and having a toothed lower end portion for scoring the bare spot to be reseeded, said lower tube including means at the upper end thereof for actuating said ball check valve to an open position;
   a screen disposed intermediate the length of the lower tube for aiding in uniformly distributing of seeds; and
   second spring means disposed between said upper and lower tubes and operative to bias said telescoping tubes in the extended position wherein said ball covers and seals said lower opening in said cage with said upper opening being left uncovered thereby allowing a fixed amount of seed to fill the cage, whereby upon manual telescoping of said upper and lower tubes relative to each other said means for actuating said ball check valve displaces said ball upwardly such that said lower opening is simultaneously covered and sealed thereby allowing the fixed amount of seed in said cage to pass through the lower tube for deposit on the bare spots.

10. A manually operable grass seeder for preparing and reseeding bare spots as in claim 9 wherein the upper end of the upper tube is closed by a removable handle that defines the upper portion of said storage hopper for the seeds.

11. A manually operable grass seeder for preparing and reseeding bare spots as in claim 10 wherein said handle is a ball type handle threadably connected to the upper end of the upper tube.

12. A manually operable grass seeder for preparing and reseeding bare spots as in claim 9 wherein said upper and lower tubes include annular flanges extending perpendicular to the length of the tubular member for limiting the extent of telescoping of said tubes.

13. A manually operable grass seeder for preparing and reseeding bare spots as in claim 9 wherein said actuating means comprises a pyramidal-shaped member having open sides to allow seed to pass therethrough.

* * * * *